(12) United States Patent
Stache (10) Patent No.: US 7,434,962 B2
(45) Date of Patent: Oct. 14, 2008

(54) LOW-PROFILE, AIMABLE LIGHTING ASSEMBLY

(75) Inventor: Mark W. Stache, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/763,885

(22) Filed: Jun. 15, 2007

(65) Prior Publication Data

US 2007/0297182 A1 Dec. 27, 2007

Related U.S. Application Data

(60) Provisional application No. 60/814,821, filed on Jun. 19, 2006.

(51) Int. Cl.
*F21V 21/30* (2006.01)

(52) U.S. Cl. .................... 362/288; 362/274; 362/490

(58) Field of Classification Search ............... 362/269, 362/274, 282, 287, 288, 322, 372, 427, 478, 362/488, 490, 493, 512, 523, 545, 546, 548
See application file for complete search history.

(56) References Cited

U.S. PATENT DOCUMENTS

| 4,061,912 | A | * | 12/1977 | Levasseur | 362/288 |
| 4,533,984 | A | * | 8/1985 | Gatton | 362/372 |
| 4,707,014 | A | * | 11/1987 | Rich | 362/493 |
| 5,567,036 | A | * | 10/1996 | Theobald et al. | 362/545 |
| 7,261,450 | B2 | * | 8/2007 | Tiesler | 362/427 |

* cited by examiner

*Primary Examiner*—Y My Quach Lee
(74) *Attorney, Agent, or Firm*—Foley & Lardner LLP (57) ABSTRACT

A lighting assembly includes a bezel, a housing coupled to the bezel, the housing having a pivot point provided on a first surface, a lamp provided between the housing and the bezel, and a biasing member configured to bias the lamp against the bezel. The biasing member engages the housing at the pivot point, and the lamp pivots relative to the housing about the pivot point.

17 Claims, 7 Drawing Sheets

LOW-PROFILE, AIMABLE LIGHTING ASSEMBLY

CROSS-REFERENCE TO RELATED PATENT APPLICATIONS

This non-provisional application claims priority from U.S. Provisional Application No. 60/814,821, filed Jun. 19, 2006, incorporated herein by reference in its entirety.

BACKGROUND

The present disclosure relates generally to the field of lighting assemblies or lamp fixtures, and more specifically, to the field of aimable or directable lighting assemblies.

Directable lighting assemblies used to provide lighting in vehicles, such as automobiles, and in other environments, are generally known. Typically, the lighting assembly is attached to another object (e.g., an automobile), and includes features that enable a user to aim or direct the lamp in a variety of directions. Generally, such lighting assemblies may rotate about an axis or pivot about a point.

In one type of such devices, to allow pivoting of the lighting assembly, the lighting assembly includes a spherical body that is held by a complimentarily shaped socket. The diameter of the body, in part, dictates the profile of the lighting assembly. A front portion (i.e., the exposed portion) of the body often houses a lens. The socket often contacts the rear of the body at multiple contact points, creating frictional forces that hold the lighting assembly in place. Some lighting assemblies may have continuous contact between the body and the socket over a portion of the exterior of the body.

SUMMARY

One exemplary embodiment relates to a lighting assembly having a bezel, a housing coupled to the bezel and having a pivot point located on a first surface, a lamp provided between the housing and the bezel, and a biasing member configured to bias the lamp with respect to the bezel. The biasing member engages the housing at the pivot point, and the lamp pivots relative to the housing about the pivot point.

Another exemplary embodiment relates to a lighting assembly for a vehicle interior, including a first housing, a second housing coupled to the first housing, and a lamp assembly provided between the first housing and the second housing. An indent on one of the lamp assembly and the second housing engages a detent on the other one of the lamp assembly and the second housing, and the lamp pivots about the interface of the indent and the detent.

Another exemplary embodiment relates to an overhead console including a first housing, a second housing member, a lamp assembly provided at least partially between the first housing and the second housing, and a spring portion extending from the lamp assembly toward the second housing and configured to bias the lamp assembly toward the first housing. The lamp assembly is configured to pivot relative to the first housing and the second housing about the spring portion.

BRIEF DESCRIPTION

DETAILED DESCRIPTION

Figure 1:
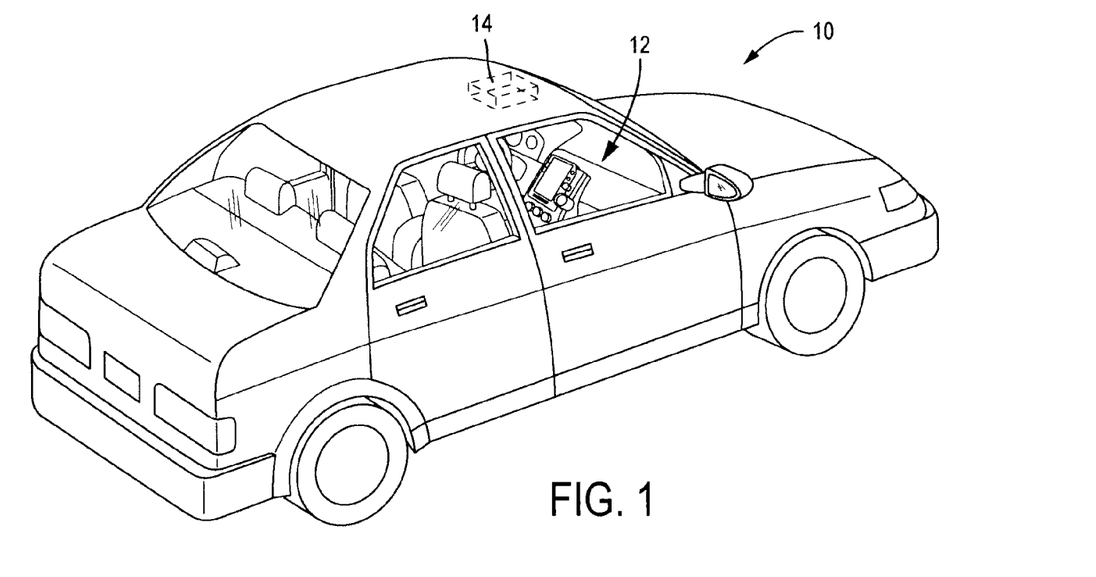
FIG. 1 is an isometric view of a vehicle including an overhead console according to an exemplary embodiment.

Referring to FIG. 1, a vehicle 10 is shown according to an exemplary embodiment. Vehicle 10 includes an interior portion 12 (e.g., a passenger compartment, etc.) and a console, shown as overhead console 14. While vehicle 10 is shown as an automobile in FIG. 1, it should be understood that according to various alternative embodiments, vehicle 10 may be any of a wide variety of vehicles, including sport utility vehicles, buses, recreational vehicles, airplanes, etc., and the teachings herein extend to all such applications.

Figure 2:
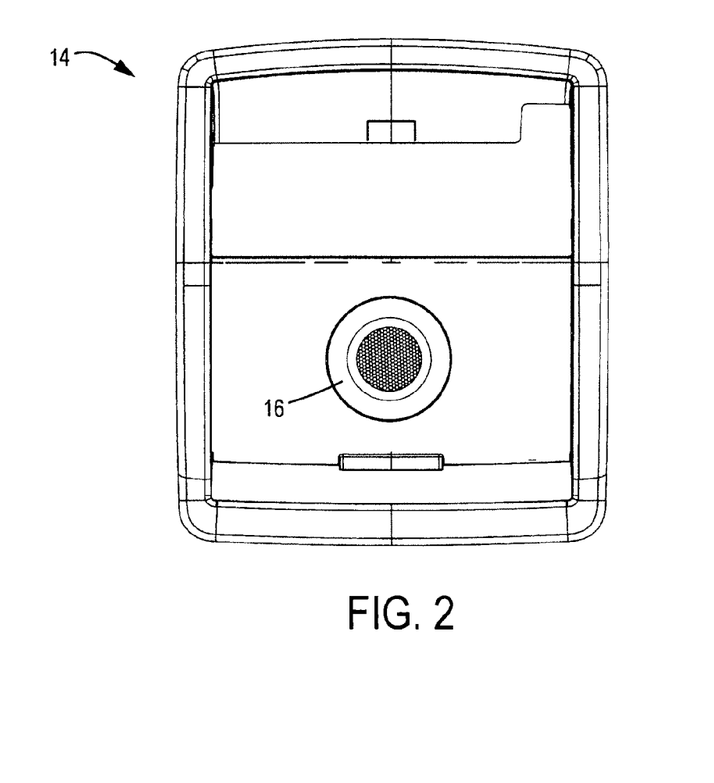
FIG. 2 is a bottom view of the overhead console of FIG. 1 according to an exemplary embodiment.

Referring to FIG. 2, overhead console 14 (e.g., an overhead component, a panel, a headliner, etc.) is shown according to an exemplary embodiment. Overhead console 14 may include at least one lighting assembly 16 (e.g., a light fixture, reading light, overhead light, lamp assembly, etc.) that is intended to provide light to, for example, interior portion 12. While lighting assembly 16 is depicted in FIG. 2 as being a part of overhead console 14, it should be understood that according to various alternative embodiments, lighting assembly 16 may be provided as a part of a wide variety of components, including side panels, seat backs, etc.

Figure 3:
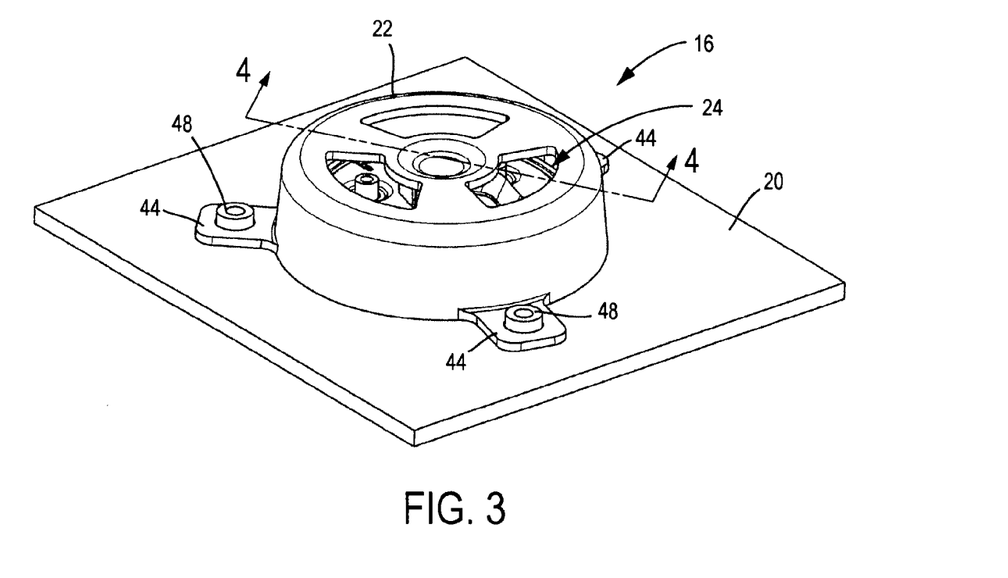
FIG. 3 is an isometric view of the lighting assembly of FIG. 2 according to an exemplary embodiment.
Figure 4:
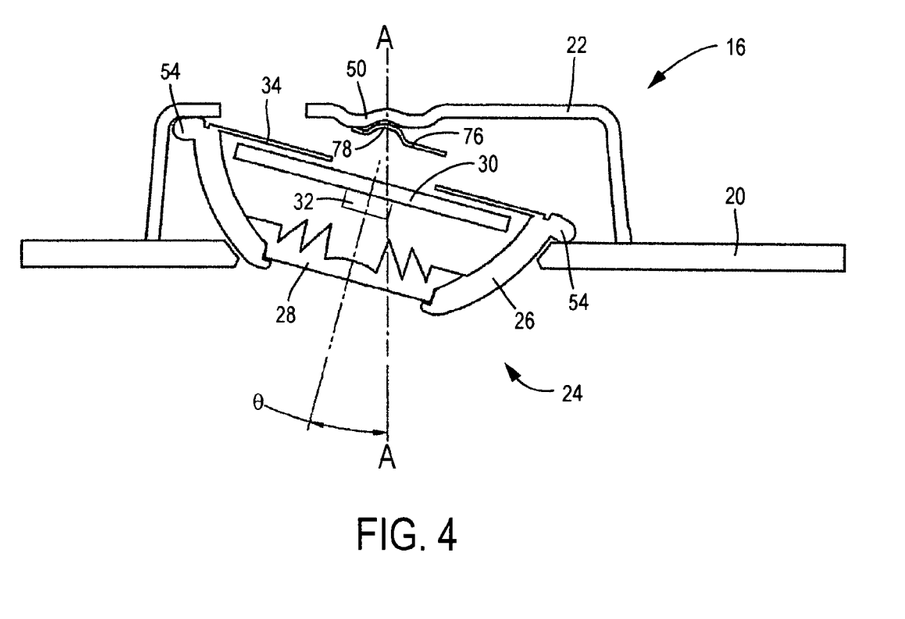
FIG. 4 is a cross section of the lighting assembly of FIG. 3 taken along line 4-4 according to an exemplary embodiment.
Figure 5:
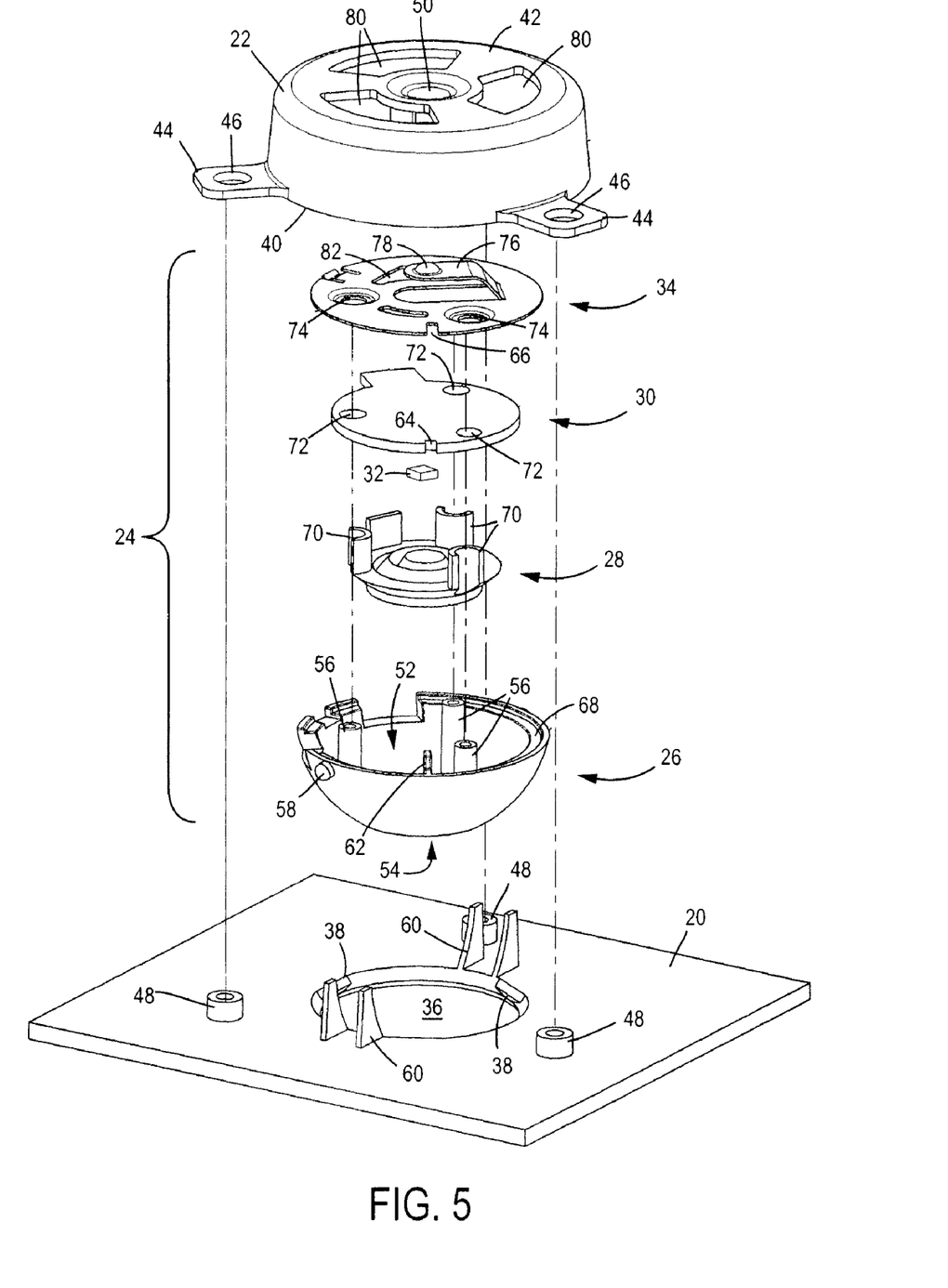
FIG. 5 is an exploded view of the lighting assembly of FIG. 3 according to an exemplary embodiment.

Referring to FIGS. 3-5, lighting assembly 16 according to an exemplary embodiment is shown. As shown in FIG. 5, lighting assembly 16 includes a front housing or bezel 20 (e.g., a first housing, support, etc.), a lamp assembly or lamp 24 (e.g., a lamp subassembly, etc.), and a rear housing or housing 22 (e.g., a second housing, cover, etc.). As shown in FIG. 3, lamp 24 is provided between housing 22 and bezel 20.

According to an exemplary embodiment, bezel 20 is generally flat, but may be of any suitable shape or size. Bezel 20 includes an aperture 36 (e.g., an opening, passage, hole, etc.). Bezel 20 may also have one or more equally spaced raised portions 38 (e.g., bumps, projections, rounded members, etc.) adjacent aperture 36 that provide the contact surfaces between bezel 20 and lamp 24. According to a preferred embodiment, bezel 20 includes three raised portions 38 positioned at equally-spaced intervals around aperture 36. Raised portions 38 are intended to facilitate the proper positioning of lamp 24 and ensure smooth pivoting of lamp 24. According to an alternative embodiment, bezel 20 is provided without raised portions 38.

Housing 22 is generally cylindrical, with an open, front portion 40 that attaches to bezel 20 and an at least partially closed, rear portion 42 that assists in securing lamp 24 between bezel 20 and housing 22. As shown in FIGS. 3 and 4, housing 22 may include one or more tabs 44 (e.g., extensions, flanges, etc.) that extend from the cylindrical body of housing 22 at front portion 40. Tabs 44 may be used to attach housing 22 to bezel 20, and may include one or more through or threaded holes 46 to accommodate various types of fasteners, etc. According to one exemplary embodiment, bezel 20 includes three heat stake posts 48 that are equally spaced about and adjacent to the periphery of housing 22 that are used to heat stake bezel 20 to housing 22.

Figure 9A:
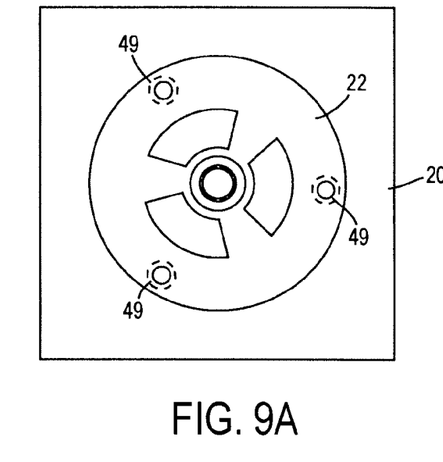
FIG. 9A is a top view of a lighting assembly showing a cover and bezel component according to one exemplary embodiment.
Figure 9B:
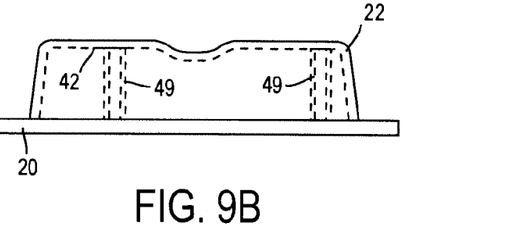
FIG. 9B is a side view of the lighting assembly of FIG. 9A.

According to an alternative embodiment, shown in FIGS. 9A-9B, housing 22 does not include tabs 44, and housing 22 is attached to bezel 20 via rear portion 42 of housing 22. As shown in FIGS. 9A-9B, bezel 20 may be attached to housing 22 using threaded fasteners that are coupled to posts 49 extending from bezel 20 that are received within housing 22.

Figure 10A:
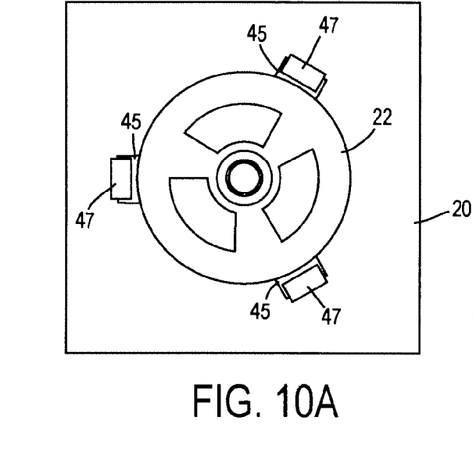
FIG. 10A is a top view of a lighting assembly showing a cover and bezel component according to another exemplary embodiment.
Figure 10B:
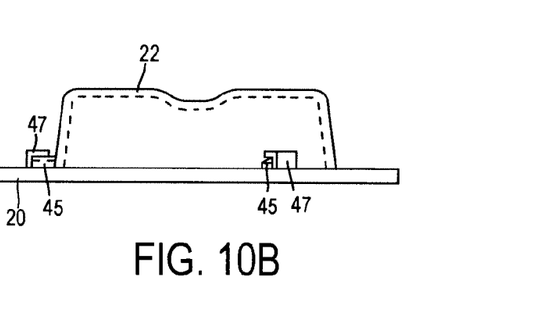
FIG. 10B is a side view of the lighting assembly of FIG. 9A.

According to another exemplary embodiment, shown in FIGS. 10A-10B, one or more wedges 45 and one or more wedge receptacles 47 are provided on the bezel 20 and the housing 22, respectively. Wedges 45 are rotated into place and held secure by wedge receptacles 47. As shown in FIGS. 10A-10B, wedges 45 are provided on housing 22 and wedge receptacles 47 are provided on bezel 20. According to an alternative embodiment, the arrangement of the wedges/receptacles may also be reversed. Other means for attaching housing 22 to bezel 20 may alternatively be used (e.g., ultrasonic welding, adhesives, etc.) according to various alternative embodiments.

Housing 22 includes a pivot point 50 (e.g., a pivot portion or area, etc.) about which lamp 24 pivots. Pivot point 50 may include a detent configured to be received in an indent in lamp 24, or conversely, may include an indent configured to receive a detent in lamp 24. As shown in FIGS. 3-5, housing 22 includes a detent. Other means of permitting lamp 24 to pivot about pivot point 50 may alternatively be used.

According to an exemplary embodiment, pivot point 50 is located in the center of rear portion 42 such that the force exerted from housing 22 onto lamp 24 is in turn distributed substantially equally about the interface between housing 22 and bezel 20 at aperture 36. This is intended to ensure smooth and consistent pivoting of lamp 24 as a user aims or directs lighting assembly 16, while still providing the proper force to maintain lighting assembly 16 in a desired position.

Referring now to FIG. 5, lamp 24 will be discussed in greater detail. Lamp 24 includes a front cover or lamp casing 26, a lens 28, a light source, shown as light emitting diode (LED) 32, a support member, shown as printed circuit board (PCB) 30, and a rear lamp support or cover, shown as lamp cover 34 (e.g., a support, housing, stamping, etc.). As shown in FIG. 5, the components of lamp 24 are generally arranged such that PCB 30 (with LED 32 coupled thereto) and lens 28 are located between lamp cover 34 and lamp casing 26.

As shown in FIGS. 3-6, lamp casing 26 is generally semi-spherical, having a first or large opening 52 configured to receive the other components of lamp 24, and a second or small opening 54 configured to receive the outer portion of lens 28 and allow light to be emitted from lamp 24. According to one embodiment, lamp casing 26 has a generally frusto-spherical shape. Lamp casing 26 may include one or more posts 56 that are used to secure the various components of lamp 24 to each other. According to an exemplary embodiment, three posts 56 are provided to secure the components of lamp 24 together, posts 56 being located with equal distances between each post 56 around the perimeter of small opening 54.

Lamp casing 26 may also include one or more anti-rotation projections 58 (e.g., knobs, extensions, tabs, etc.). Projections 58 may be located adjacent large opening 52 and extend outward from the body of lamp casing 26. Projections 58 are configured such that upon assembling lamp 24, projections 58 are captured between one or more members 60 (e.g., tabs, extensions, ribs, etc.) provided on bezel 20 that may form a recess, channel, etc. While the embodiment of lighting assembly 16 in FIG. 5 shows members 60 extending upward from bezel 20, according to other exemplary embodiments, members 60 may be provided on housing 22. According to still other exemplary embodiments, bezel 20 and housing 22 may include corresponding members that are proximate to each other when the light assembly 16 is assembled and that act to limit the rotation of lamp 24 by engaging projections 58 or being contained between two projections 58 (e.g., within a recess, etc.). Projections 58 and members 60 may be configured such that lamp 24 may only rotate a given amount in either direction about the centerline axis of lamp 24 when lighting assembly 16 is fully assembled. According to an exemplary embodiment shown in FIG. 5, projections 58 are not visible when lighting assembly 16 is in use.

Figure 6:
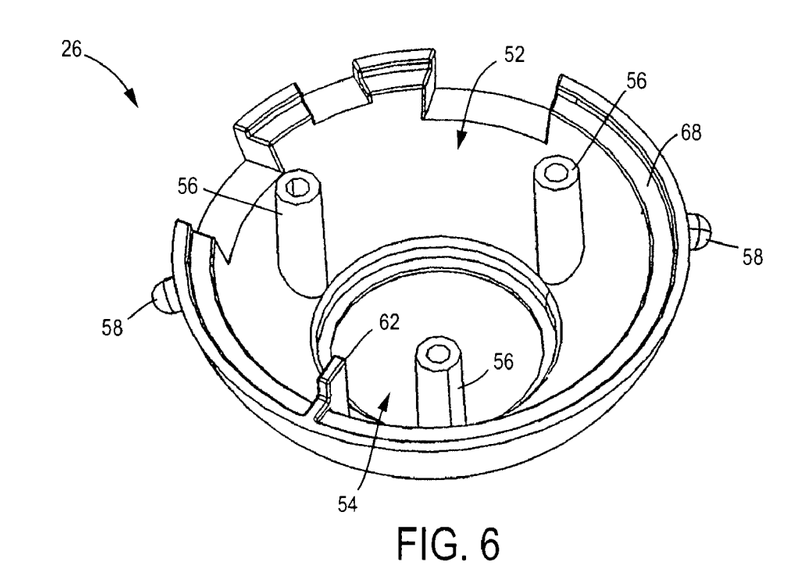
FIG. 6 is an isometric view of the lamp casing shown in FIG. 4 according to an exemplary embodiment.

According to an exemplary embodiment, lamp casing 26 includes one or more ribs or extensions 62 that are positioned such that the rib 62 is received in notches 64 and 66 in PCB 30 and lamp cover 34, respectively. Rib 62 and notches 64 and 66 are intended to assist in preventing relative rotation between the components of lamp 24. Although FIGS. 5 and 6 show rib 62 on lamp casing 26 configured to engage notches 64 and 66 in PCB 30 and lamp cover 34, alternative means of preventing relative rotation between the various components of lamp 24 may be used. For example, the relative positions of the rib and the notch(es) may be reversed. Further, multiple ribs/notches may be used.

Lamp casing 26 may further include one or more shoulders 68 on the interior of lamp casing 26 intended to facilitate the mounting of lens 28, PCB 30, and/or lamp cover 34. As shown in FIG. 5, shoulder 68 is configured to support the outer edge of lamp cover 34. Shoulder 68 may form a partial, or complete, circular shape around the interior of lamp casing 26, and may consist of one or more separate portions. Other means of supporting one or more of the other components of lamp 24 may alternatively be used.

Lamp 24 also includes lens 28. According to an exemplary embodiment, lens 28 is configured to be used with LED 32. Lens 28 focuses and diffuses light emitted by LED 32. As shown in FIG. 5, lens 28 is a combination diffusing lens/focusing lens. Alternatively, two lenses (e.g., a diffusing lens and a separate focusing lens) may be used. Lens 28 fits within lamp casing 26, and is secured between the interior surface of lamp casing 26 and PCB 30. One or more spacers 70 may be provided on lens 28 to maintain the appropriate distance between PCB 30 and lens 28 and provide mounting space for LED 32 onto PCB 30. As shown in FIG. 5, spacers 70 are configured to conform to posts 56 on lamp casing 26. Other means of maintaining the proper separation between lens 28 and PCB 30 may alternatively be used.

Lamp 24 also includes PCB 30, upon which LED 32 is mounted. As shown in FIG. 5, PCB 30 may include one or more through holes 72 for mounting PCB 30. Other means of fastening PCB 30 to the other components of lamp 24 may alternatively be used (for example, the holes may be threaded, or posts may be provided that mate with or thread to other parts of the lamp). PCB 30 may also include a notch 64 which, as discussed with respect to lamp casing 26, is intended to assist in preventing relative rotation between the lamp components. Notch 64 may be of any suitable shape or size and be located at any suitable location.

According to an exemplary embodiment, rather than PCB 30 and LED 32 discussed herein with respect to FIGS. 3-5, lighting assembly 16 may be provided with an alternate type of light source. For example, lighting assembly 16 may be provided with a traditional incandescent bulb or other type of light source. In such a case, PCB 30 may be replaced with a mounting plate, socket, or other device configured to receive the light source.

Lens 28, PCB 30, and LED 32 are secured between lamp casing 26 and lamp cover 34. As shown in FIG. 3-5, lamp cover 34 may be a generally flat, circular piece configured to be received within or on top of the open end of lamp casing 26. Lamp cover 34 includes notch 66 similar to notch 64 in PCB 30, and further includes one or more through holes 74 used to secure lamp cover 34 and the other various lamp components to lamp casing 26. As shown in FIGS. 3-5, the components are secured using heat-staking. Alternatively, the components may be fastened using ultrasonic welding, mechanical fasteners, or any other suitable means.

Lamp cover 34 may include a spring portion 76 (e.g., a spring arm, raised member or portion, biasing member, etc.) with a pivot 78 located generally in the central portion of lamp cover 34. Spring portion 76 is configured to provide a spring force between pivot 78 and pivot point 50 on housing 22 that is in turn transferred to the interface between lamp casing 26 and bezel 20. Pivot 78 may be located along axis A-A shown in FIG. 4 such that the spring force is equally distributed about the circumference of the portion of lamp casing 26 that interfaces with bezel 20. This is intended to ensure smooth and consistent pivoting of lamp 24 within lighting assembly 16, and is an advantage over more traditional aimable lamp assemblies that have a spherical rear portion that is substantially enclosed by a conforming socket, where unnecessary frictional and other forces may be generated and impede smooth pivoting of the lighting assembly. Further, in traditional lamp assemblies the rear spherical profile prevents installation into areas requiring a lower profile assembly such as the one disclosed herein.

According to an exemplary embodiment, lamp cover 34 may be a stamping made from metal (e.g., sheet metal). Alternatively, lamp cover 34 may be made from any suitable material (e.g., a plastic material) capable of providing the necessary spring force characteristics for lamp cover 34 and able to withstand the heat generated by LED 32 or other light source when lighting assembly 16 is in use.

Lighting assembly 16 may be wired using any conventional wiring and/or cabling suitable to power and control PCB 30, LED 32 and/or any other electronic components that may be used. As shown in the FIGURES, housing 22 may be provided with one or more openings 80 and lamp cover 34 may be provided with one or more openings 82 intended to facilitate the passage of wires to power and control PCB 30 and LED 32. Any suitable configuration of openings for lamp cover 34 and housing 22 may be used.

Figure 7:
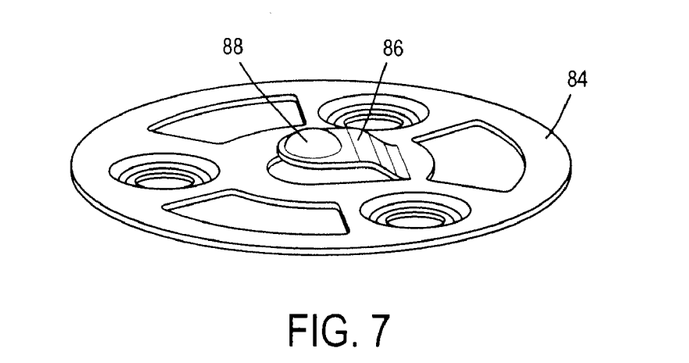
FIGS. 7 and 8 are isometric views of a lamp cover for a lighting assembly according to various exemplary embodiments.

Another exemplary embodiment of a lamp cover is shown in FIG. 7. Cover 84 is similar to lamp cover 34 of FIG. 5 and includes a spring portion 86 (e.g., a spring arm, etc.) with a pivot 88 located generally in the central portion of lamp cover 84. As shown in FIG. 7, cover 84 does not include a notch (such as notch 66 shown in FIG. 5).

Figure 8:
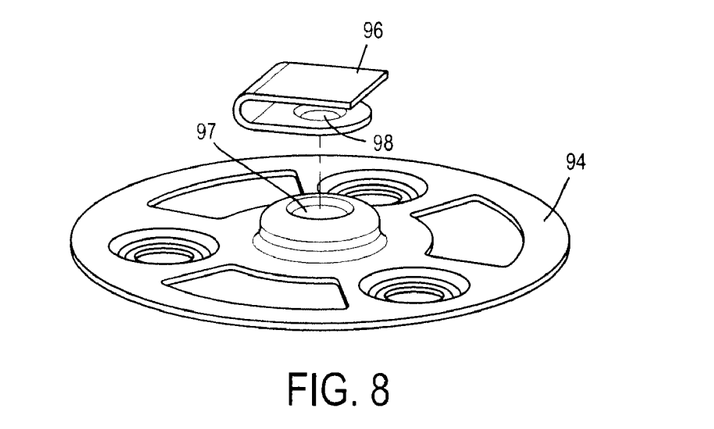

Another exemplary embodiment of a lamp cover is shown in FIG. 8. A lamp cover 94 is provided without a spring portion, and a separate spring 96 is provided between lamp 24 and housing 22 to provide the spring force for lighting assembly 16. As shown in FIG. 8, spring 96 may be formed of a metal stamping and include a recess 93 to receive a pivot interface 98 provided on spring 96. Alternative types of materials and spring types (e.g., coil springs, etc.) may be used. Spring 96 may be permanently or removable secured to lamp 24 using any suitable means, and lamp 24 may pivot with respect to spring 96 (e.g., pivot interface 98 may be located on spring 96 rather than the cover). In such a case, lamp 24 may be a plastic material that would interface with, for example, a metal spring. Other materials may alternatively be used to fabricate lamp cover 94.

Referring back to FIGS. 3-4, lamp 24 is secured between the bezel 20 and the housing 22. When lighting assembly 16 is fully assembled, lamp 24 is positioned such that lamp casing 26 extends beyond and interfaces with aperture 36 in bezel 20. The rear portion of lamp 24 (e.g., lamp cover 34) interfaces at pivot point 78 with housing 22. The profiles of the various parts are configured such that, when lighting assembly 16 is assembled, spring portion 76 of lamp 24 is compressed, thereby creating a biased interface between lamp 24 and the bezel 20. Because of the centralized location of pivot point 78 along axis A-A (see FIG. 4), the bias is substantially equally distributed about the interface between lamp casing 26 and bezel 20.

Figure 11:
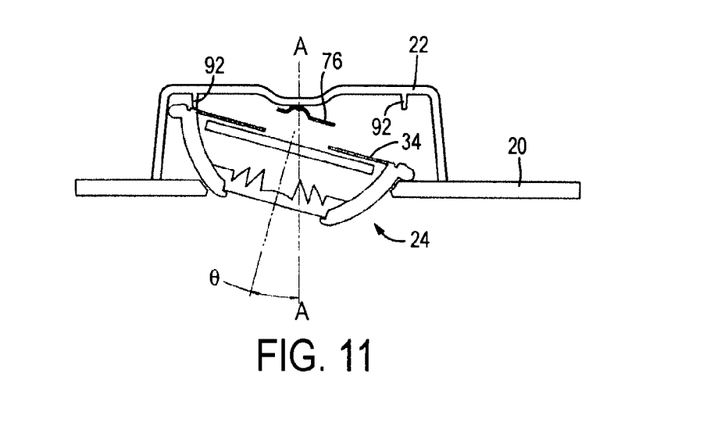
FIG. 11 is a cross section view of a lighting assembly according to another exemplary embodiment.

Referring now to FIG. 11, additional projections or spacers 92 may be provided on the interior of the back end of housing 22. Spacers 92 may be provided to maintain a minimum separation distance between lamp 24 and the interior of the back end of housing 22 and prevent, for example, a user of lighting assembly 16 from over-depressing the spring portion of the lamp cover. Spacers 92 may further maintain a maximum pivot angle θ of lamp 24. Other means of maintaining maximum pivot angle θ of lamp 24 may alternatively be used. Spacers 92 may be integrally molded, mechanically fastened, ultrasonically welded, or otherwise secured to housing 22 using any suitable means, and may be made of any suitable material (e.g., plastic, metal, etc.). Alternatively, spacers 92 maybe provided on lamp cover 34 rather than housing 22. According to a further alternative embodiment, spacers 92 may be provided adjacent pivot 50 in order to maintain proper control of the movement of lamp 24 tending to compress the spring portion 76.

As shown in the FIGURES, the configuration of the lamp as generally semi-spherical, and the use of a pivot interface point, rather than a full-spherical lamp body contained within a socket-type receptacle, allows for a lower profile lighting assembly that still maintains an acceptable range of motion. The movement of pivoting range of the lamp within the lighting assembly may be controlled in various ways. For example, projections 58 on lamp casing 26 and members 60 on the interior of housing 22 and/or on the bezel 20 may be used to prevent over-rotation of lamp 24 about axis A-A (see FIG. 4). Among other things, this may prevent damage to wiring due to twisting, bending, etc. Spacers 92 between lamp 24 and the rear surface of housing 22 may be used to prevent a user from over-compressing spring arm 76 of lamp cover 34 and potentially disengaging lamp casing 26 from bezel 20 (see FIG. 11). This is intended to, in part, ensure that the spring arm and/or pivoting components are not damaged during use. Further, as shown for example in FIG. 4, the distance between housing 22 and bezel 20 may be controlled such that the maximum pivot angle θ of lamp 24 may be maintained. According to an exemplary embodiment, lamp 24 is allowed to pivot a maximum of approximately 15 degrees from the straight position (i.e., the position where axis A-A is perpendicular to bezel 20).

Figure 12:
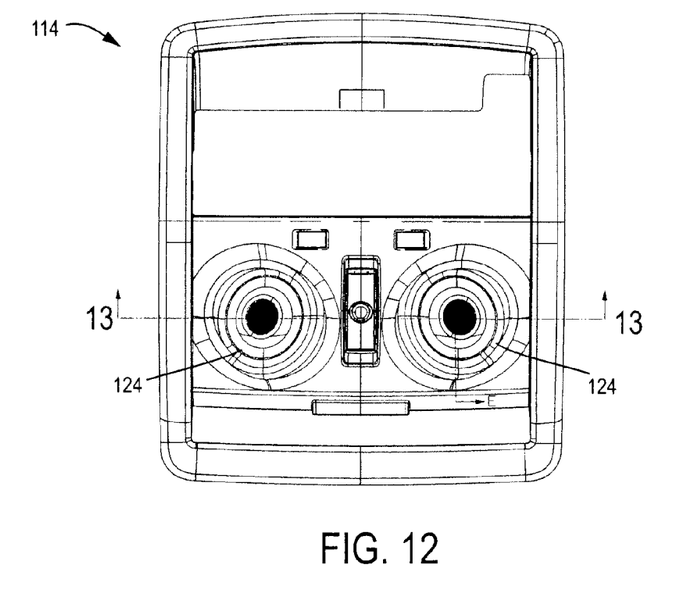
FIG. 12 is a bottom view of an overhead of console according to an alternative exemplary embodiment.
Figure 13:
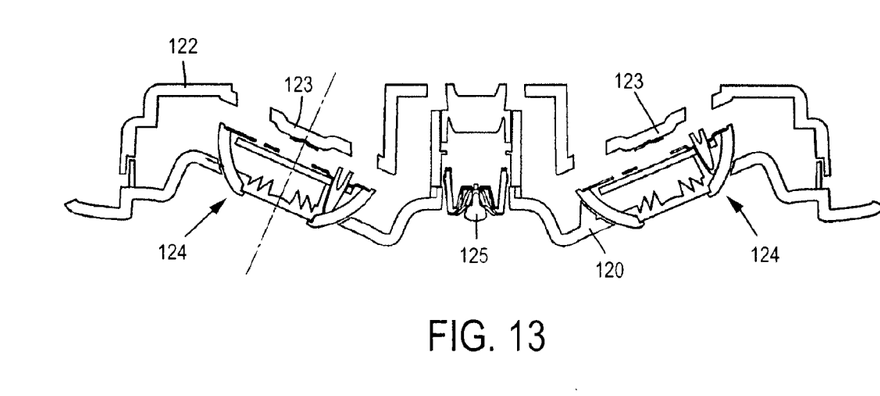
FIG. 13 is a cross section of the overhead console of FIG. 12 according to an exemplary embodiment.
Figure 14:
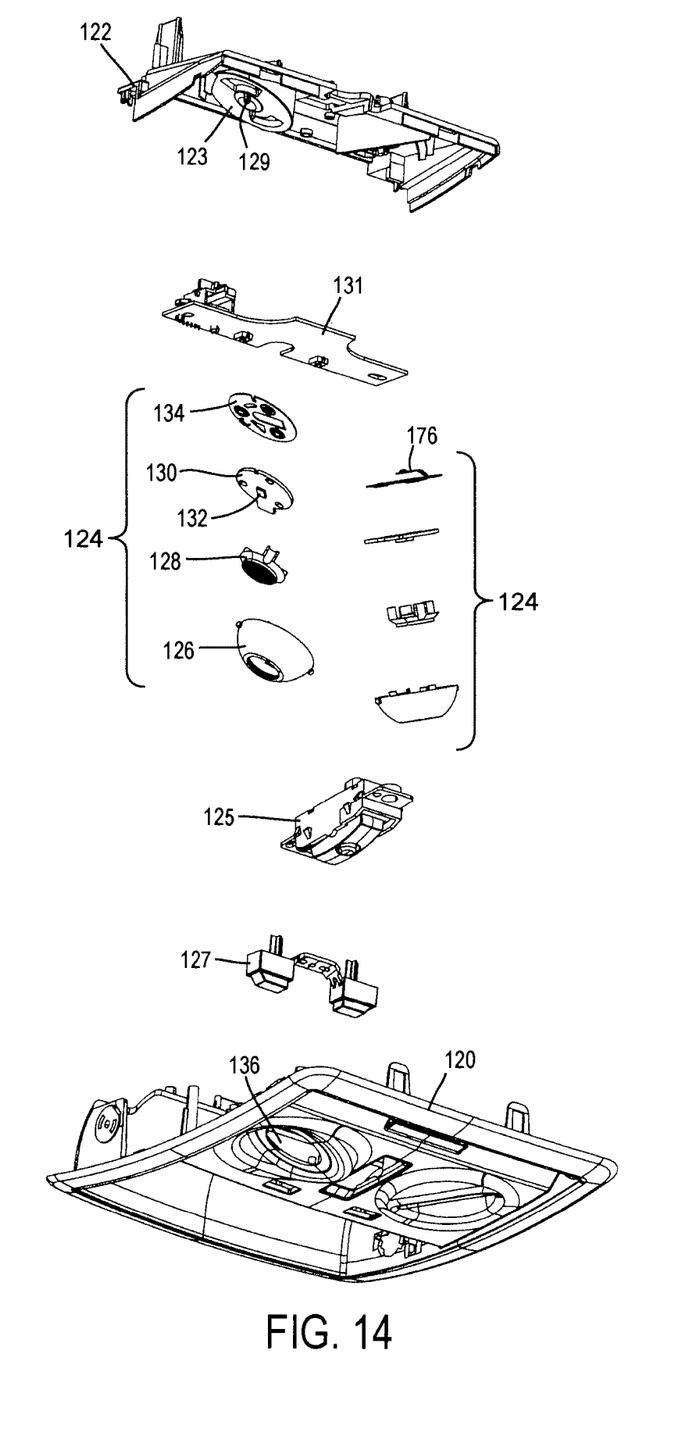
FIG. 14 is an exploded view of the overhead console of FIG. 12 according to an exemplary embodiment.

FIGS. 12-14 show an overhead console 114 according to another exemplary embodiment. Overhead console 114 includes a front housing (e.g., bezel) 120, a rear cover or housing 122, and one or more lamps 124 provided between bezel 120 and rear housing 122. Console 114 may also include one or more buttons or switches 125 for the lamps, switches 127, and a printed circuit board 132 for controlling other features and components (e.g., a dome lamp, etc.). Lamps 124 are similar to lamp 24 of FIG. 5 and include a lamp casing 126, a lens 128, a printed circuit board (PCB) 130 upon which a light-emitting diode (LED) 132 is mounted, and a lamp cover 134. Lamp cover 134 includes a spring arm 176 similar to, e.g., spring arm 76 shown in FIG. 5, that pivots on a pivot portion 129 provided on an angled wall 123 formed by rear cover 122. Spring arm 176 biases lamp 124 towards an aperture 136 in bezel 120. As can be seen in FIG. 13, bezel 120 and housing 122 may be configured to provide multiple lamp assemblies at various angles and orientations to suit various applications, etc. Furthermore, the bezel 120 and housing 122 may be integrated into other vehicle components, etc., for example to serve as general components of an overhead console (such as console 1119).

According to these or other exemplary embodiments, other components may be included with the lamp assemblies illustrated with respect to the FIGURES, such as accessories and mounting devices to suit other applications.

The construction and arrangement of the elements of the lighting assembly and the methods for making a lighting assembly as shown in the illustrated and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied.

It should be noted that the elements and/or assemblies of the lighting assembly may be constructed from any of a wide variety of materials that provide sufficient strength or durability, including any of a wide variety of moldable plastic materials (such as high-impact plastic), or polymers, etc. and in any of a wide variety of colors, textures, and combinations. The shape and size of the various components may be varied to improve the appearance, formability, and assembly of the lighting assembly and the lighting assembly sub-components. Other substitutions, modifications, changes, and omissions may be made in the design, operating conditions, and arrangement of the preferred and other exemplary embodiments without departing from the scope of the present inventions.

The order or sequence of any process or method steps may be varied or re-sequenced according to alternative embodiments. Other substitutions, modifications, changes and omissions may be made in the design, operating configuration, and arrangement of the preferred and other exemplary embodiments without departing from the spirit of the present invention.

What is claimed is:

1. A lighting assembly comprising:
   a bezel;
   a housing coupled to the bezel, the housing having a pivot point located on a first surface;
   a lamp provided between the housing and the bezel; and
   a biasing member configured to bias the lamp against the bezel;
   wherein the biasing member engages the housing at the pivot point, and the lamp pivots relative to the housing about the pivot point, and
   wherein the lamp comprises a frusto-spherical portion that is in sliding engagement with a passage in the bezel.

2. The assembly of claim 1 wherein the lamp comprises a light emitting diode.

3. The assembly of claim 2 wherein the lamp comprises a printed circuit board; and
   wherein the light emitting diode is coupled to the printed circuit board.

4. The assembly of claim 1 wherein the lamp comprises a support, the biasing member being an integrally formed portion of the support.

5. The assembly of claim 4 wherein the support is a stamped metal piece and the biasing member comprises a raised portion of the support.

6. A lighting assembly comprising:
   a bezel;
   a housing coupled to the bezel, the housing having a pivot point located on a first surface;
   a lamp provided between the housing and the bezel;
   a biasing member configured to bias the lamp against the bezel;
   a projection extending from the lamp; and
   a recess provided in the housing;
   wherein the biasing member engages the housing at the pivot point, and the lamp pivots relative to the housing about the pivot point, and
   wherein the projection engages the recess to restrict the movement of the lamp.

7. A lighting assembly comprising:
   a bezel;
   a housing coupled to the bezel, the housing having a pivot point located on a first surface;
   a lamp provided between the housing and the bezel;
   a biasing member configured to bias the lamp against the bezel; and
   a projection extending from the housing;
   wherein the biasing member engages the housing at the pivot point, and the lamp pivots relative to the housing about the pivot point, and
   wherein the biasing member is configured to compress as a result of movement of the lamp; and
   wherein the projection limits the compression of the biasing member.

8. A lighting assembly comprising:
   a bezel;
   a housing coupled to the bezel, the housing having a pivot point located on a first surface;
   a lamp provided between the housing and the bezel;
   a biasing member configured to bias the lamp against the bezel; and
   a passage provided in the bezel that defines an axis;
   wherein the biasing member engages the housing at the pivot point, and the lamp pivots relative to the housing about the pivot point, and
   wherein the lamp engages the housing to restrict pivoting of the lamp relative to the axis of the passage.

9. The assembly of claim 8 wherein the pivoting of the lamp is restricted to a maximum of approximately 15 degrees of offset from the axis of the passage.

10. A lighting assembly for a vehicle interior, comprising:
a first housing;
a second housing coupled to the first housing; and
a lamp assembly provided between the first housing and the second housing;
wherein an indent on one of the lamp assembly and the second housing engages a detent on the other one of the lamp assembly and the second housing at an interface;
wherein the lamp assembly pivots about the interface of the indent and the detent; and
wherein the detent is provided on a biasing member that biases the lamp assembly toward the first housing.

11. The lighting assembly of claim 10 wherein the lamp assembly comprises a generally flat support facing the second housing, and the biasing member is coupled to the support.

12. The lighting assembly of claim 11 wherein the support is integrally formed with the biasing member.

13. A lighting assembly for a vehicle interior, comprising:
a first housing;
a second housing coupled to the first housing;
a lamp assembly provided between the first housing and the second housing; and
a projection provided on the lamp assembly configured to engage a recess in the second housing and limit the range of movement of the lamp assembly relative to the second housing;
wherein an indent on one of the lamp assembly and the second housing engages a detent on the other one of the lamp assembly and the second housing at an interface; and
wherein the lamp assembly pivots about the interface of the indent and the detent.

14. A lighting assembly for a vehicle interior, comprising:
a first housing;
a second housing coupled to the first housing; and
a lamp assembly provided between the first housing and the second housing;
wherein an indent on one of the lamp assembly and the second housing engages a detent on the other one of the lamp assembly and the second housing at an interface;
wherein the lamp assembly pivots about the interface of the indent and the detent; and
wherein the first housing comprises a plurality of raised portions adjacent an aperture in the first housing, and the lamp assembly engages the first housing at the plurality of raised portions.

15. An overhead console, comprising:
a first housing;
a second housing;
a lamp assembly provided at least partially between the first housing and the second housing; and
a spring portion extending from the lamp assembly toward the second housing and configured to bias the lamp assembly toward the first housing;
wherein the lamp assembly is configured to pivot relative to the first housing and the second housing about the spring portion; and
wherein a projection provided on the lamp assembly engages a channel provided in the second housing to limit the rotation of the lamp assembly.

16. The overhead console of claim 15 wherein the lamp assembly comprises a light emitting diode.

17. The overhead console of claim 15 wherein the lamp assembly comprises a generally flat surface that faces the second housing and the spring portion extends from the flat surface.

* * * * *